United States Patent [19]

Fukae

[11] Patent Number: 4,959,731
[45] Date of Patent: * Sep. 25, 1990

[54] COMBINED ELECTROGRAPHIC PRINTER, COPIER, AND TELEFAX MACHINE

[75] Inventor: Kensuke Fukae, Monsey, N.Y.

[73] Assignee: Kentek Informatio Systems, Inc., Allendale, N.J.

[*] Notice: The portion of the term of this patent subsequent to Jun. 28, 2005 has been disclaimed.

[21] Appl. No.: 211,711

[22] Filed: Jun. 27, 1988

Related U.S. Application Data

[63] Continuation of Ser. No. 61,425, Jun. 9, 1987, Pat. No. 4,754,300.

[51] Int. Cl.[5] .................. H04N 1/10; H04N 1/23; G03G 15/04
[52] U.S. Cl. .................. 358/300; 346/107 R; 355/238; 355/202; 358/483; 358/484
[58] Field of Search .............. 355/200, 202, 210, 211, 355/212, 228, 233, 238, 245; 358/300, 296, 474, 483, 484, 494; 346/107 R

[56] References Cited

U.S. PATENT DOCUMENTS

| | | |
|---|---|---|
| 3,907,421 | 9/1975 | Jordan et al. |
| 4,200,390 | 4/1980 | Tagashira et al. |
| 4,268,157 | 5/1981 | Ebi et al. |
| 4,291,341 | 9/1981 | Yajima |
| 4,389,655 | 6/1983 | Baues |
| 4,398,816 | 8/1983 | Nakajima et al. |
| 4,401,383 | 8/1983 | Suzuki et al. |
| 4,402,591 | 9/1983 | Nakahata |
| 4,403,851 | 9/1983 | Yanagawa |
| 4,415,981 | 11/1983 | Cutter et al. |
| 4,432,632 | 2/1984 | Yokota .................. 355/245 |
| 4,446,472 | 5/1984 | Kato et al. |
| 4,470,693 | 9/1984 | Dolan |
| 4,502,064 | 2/1985 | Shapir |
| 4,527,885 | 7/1985 | Avata et al. |
| 4,556,308 | 12/1985 | Hoppner et al. .................. 355/200 |
| 4,640,601 | 2/1987 | Deguchi et al. |

FOREIGN PATENT DOCUMENTS

| | | |
|---|---|---|
| 0139448 | 5/1985 | European Pat. Off. |
| 0042071 | 10/1985 | European Pat. Off. |
| 2518615 | 11/1976 | Fed. Rep. of Germany |
| 3109036 | 1/1982 | Fed. Rep. of Germany |
| 1272807 | 5/1972 | United Kingdom |
| 1374799 | 11/1974 | United Kingdom |
| 1415402 | 11/1975 | United Kingdom |
| 1486025 | 9/1977 | United Kingdom |
| 2104449 | 3/1983 | United Kingdom |
| 2139193 | 11/1984 | United Kingdom |
| 2189438 | 10/1987 | United Kingdom |

OTHER PUBLICATIONS

Duplex Copier, G. W. Baumann and C. A. Queener, IBM Technical Disclosure Bulletin, vol. 19, No. 9, Feb. 1977.

Primary Examiner—George H. Miller, Jr.
Assistant Examiner—Scott A. Rogers
Attorney, Agent, or Firm—Marmorek, Guttman & Rugenstein

[57] ABSTRACT

An electrographic printing apparatus capable of functioning as a copier, printer, and telefax machine is disclosed. The electrographic printing apparatus includes a photoconductive member, preferably a horizontally mounted photoconductive belt, a developer unit for developing an electrostatic latent image on the photoconductive member, and a biased transfer roller to transfer the developed electrostatic latent image to a sheet of copy material. The apparatus also includes an optical print head which can receive information from a local or a remote source to form the electrostatic latent image on the photoconductive member and thus act as a printer. The apparatus further includes a device for scanning an original document and for projecting the scanned image either onto the photoconductive member or onto a CCD linear array. When the scanned image is projected onto the photoconductive member, a copy of the original document is made. When the image is projected onto the CCD linear array, the scanned image is digitized and sent via the telephone lines in the manner of a telefax machine.

24 Claims, 1 Drawing Sheet

COMBINED ELECTROGRAPHIC PRINTER, COPIER, AND TELEFAX MACHINE

BACKGROUND OF THE INVENTION

This is a continuation of application Ser. No. 061,425, filed June 9, 1987, now U.S. Pat. No. 4,754,300.

This invention relates to a combined electrographic printing, copying, and telefax machine. More specifically, the present invention relates to a compact electrographic printing apparatus which is capable of:

(1) scanning and copying an original document, (2) receiving and printing information derived from a local source, such as information derived from a computer connected to the apparatus, (3) receiving and printing information derived from a remote source, for example, information derived from a remote computer or telefax machine, and (4) scanning an original document and transmitting the information thereon to a remote source via the telephone lines.

All of the foregoing printing functions are performed on plain paper using an electrographic or xerographic printing engine which, in one particularly preferred embodiment, includes a horizontally disposed photoconductive belt.

In the process of electrographic or xerographic printing, a photoconductive member is employed to record an image on a photosensitive surface. The photoconductive member, which may typically take the form of a belt or a drum, is charged to a substantially uniform potential to sensitize its surface. A light is then employed to discharge selected areas of the photosensitive surface to form an electrostatic latent image on the photoconductive member.

In the case of a copying machine, an original document is exposed to high intensity light. Through the use of a slit aperture, mirrors, and various other optical components, the reflected light image of the original document is shined onto a sensitized photoconductive member where it discharges selected areas of the photosensitive surface. This light image is recorded as an electrostatic latent image on the photoconductive member and it corresponds to the informational areas contained on the original document.

In the case of an electrographic printer connected to a computer, a similar process is used to record information on the photoconductive member. The charged portion of the photosensitive surface is exposed to a light image, the shape of which is controlled by input signals from the computer. For example, a laser or an LED array functions as an optical print head and illuminates the photoconductive member with a light image, the characteristic shape of which is controlled by a stream of data from the computer. Here too, an electrostatic latent image corresponding to desired informational areas is recorded on the photoconductive member.

After recording the electrostatic latent image on the photoconductive member, the latent image is developed by bringing a developer material or toner into contact with it. The developer material comprises triboelectrically charged toner particles which are attracted to the electrostatic latent image. The toner particles form a mirror image on the photoconductive member corresponding to the electrostatic latent image. This powder image is subsequently transferred to a sheet of recording medium, such as a sheet of paper, by a transfer unit. In general, the transfer unit comprises a corona charger which creates a high intensity electric field of suitable polarity about the sheet of paper. The powder image, comprising charged toner particles on the photoconductive member are attracted and transferred to the sheet. Thereafter, the powder image is permanently affixed to the sheet in image configuration by a variety of methods such as by fusing, and the sheet is ejected.

The above-mentioned operations may be carried out by arranging a number of stations in sequence about the photoconductive member. Thus, the photoconductive member is usually surrounded in sequence by a charging station to charge the photoconductive member, an imaging station to form an electrostatic latent image on the photoconductive member, a developing station to develop the electrostatic latent image on the photoconductive member, and a transfer station to transfer the developed image from the photoconductive member to the sheet of recording medium. A discharging station and a cleaning station are also arranged about the photoconductive member to ready it for use again.

The assignee of the present invention has disclosed and claimed a high speed electrographic printer/copier and components thereof in a number of patent applications A basic objective of the assignee has been to design the electrographic printer/copier from modular components. These modular components can be easily replaced when their useful lives have been exceeded or when they become defective. The electrographic printer/copier is described in application Ser. No. 700,813, filed Feb. 11, 1985, now U.S. Pat. No. 4,664,507. A photoconductive belt in the form of a disposable cassette with a charging unit attached thereto is described in application Ser. No. 718,947, filed April 2, 1985, now U.S. Pat. No. 4,657,369. A developer unit containing a disposable toner cartridge is described in application Ser. No. 718,946, filed April 2, 1985, now U.S. Pat. No. 4,639,116. A paper input cassette is disclosed in application Ser. No. 718,945, filed April 2, 1985. Two different modular cleaning units for attachment to the photoconductive belt are described in application Ser. No. 033,458, filed April 1, 1987, and application Ser. No. 033,457, filed April 1, 1987. All of the above applications and patents have been assigned to the present assignee and all are incorporated herein by reference.

Telefax transmitting and receiving machines, also known as facsimile machines, resemble electrographic copiers and printers in many respects. Typically, telefax machines include a device for scanning an original document and for digitizing the scanned image, and a printing engine. Advanced high speed, high resolution, telefax machines employ charge-coupled devices (CCD's) for digitizing the scanned image. All CCD's are basically shift registers which digitize analog information and store the digitized information until it is delivered as an electrical signal. CCD's have been utilized as image sending devices for a variety of purposes. In particular, CCD linear arrays have been used as linear sensing devices in high performance telefax machines. To transmit information, such as graphics or text, on a sheet of paper via a telefax machine, the sheet of paper is scanned with a high intensity light and the image is focused onto a CCD linear array. The CCD digitizes the image and converts it into a stream of data, or bit stream. This bit stream, which optionally may be compressed by a variety of known techniques, is then transmitted over the telephone lines to a remote location using a modem.

A telefax machine or a computer at the remote location includes a modem to receive the bit stream over the telephone lines. After decompression when required, the bit stream controls the operation of a print engine to reproduce the information contained on the scanned original document. Telefax machines are known which employ an electrographic process to reproduce the original document at a remote location. Thus, in a process very similar to that described above for a printer, the bit stream received at the remote location can control an optical print head to focus an image on a photoconductive member and thereby produce an electrostatic latent image thereon corresponding to the original document. The electrostatic latent image can then be developed with a toner to form a powder image which is then transferred and fused to a sheet of plain paper.

As copiers, printers and telefax machines can all be adapted to employ an electrographic process to print information on a sheet of recording medium, it would be desirable to provide a single machine which is switchable between copying, printing, and telefax transmitting and receiving modes.

It is therefore an object of the present invention to provide a machine which is capable of scanning an original document, reproducing the scanned image on a sheet of paper, digitizing and sending the scanned image to a remote location, and printing digitized information received from a local or a remote source.

It is a further object of the present invention to provide such a machine which employs an electrographic print engine to carry out its printing functions.

It is a further object of the present invention to provide such a machine which utilizes many of the modular components of applicant's previously disclosed and claimed electrographic printer/copier.

It is a further object of the present invention to provide such an electrographic printing apparatus which is compact and has a low profile.

It is yet another object of the present invention to provide such an electrographic printing apparatus which has a simple paper path.

It is yet another object of the present invention to provide such an electrographic printing apparatus which employs a biased transfer roller to transfer a developed latent image to a sheet of the recording medium.

As used herein, the term "electrographic printing apparatus" and the like are intended to include copiers, printers and telefax machines which employ a photoconductive member to print information on a sheet of recording medium.

SUMMARY OF THE INVENTION

These and other objects are accomplished by means of the present invention which comprises a compact, low-profile electrographic printing apparatus capable of functioning as a copier, printer, and telefax machine. The electrographic printing apparatus comprises a housing, a source of copy material, a photoconductive member, means for discharging selected portions of the photoconductive member to form an electrostatic latent image on the photoconductive member, means for developing the electrostatic latent image, and means for transferring the developed image to the copy material. Preferably the means for discharging selected portions of the photoconductive member comprises an optical print head. The optical print head is controlled by stream of data received from a local source, or by a stream of data received from a remote source, such as a remote computer or a remote telefax machine.

The electrographic printing apparatus of the present invention also includes means for scanning an original document and means for projecting the scanned image onto the photoconductive member to produce an electrostatic latent image thereon. Alternatively, the projecting means can project the scanned image onto a CCD linear array where it is digitized. The digitized image, after compression, can then be sent to a remote location using a modem and the telephone lines. Thus, the electrographic printing apparatus of the present invention is switchable between acting as a printer, a copier, and a telefax machine.

In a preferred embodiment, the electrographic printing apparatus of the present invention includes a modular photoconductive belt which is horizontally mounted in the housing. This results in a machine which is compact and has a low profile.

In a further preferred embodiment of the invention, the means for transferring the electrostatic latent image to the sheet of paper comprises a transfer roller biased at a voltage of between about +24 V and +100 V. This biasing voltage acts to attract the powder image from the photoconductive member to the sheet of paper.

Other further and favorable aspects of the present invention may be discerned from the detailed description set forth below.

DETAILED DESCRIPTION OF PREFERRED EMBODIMENTS

Figure 1:
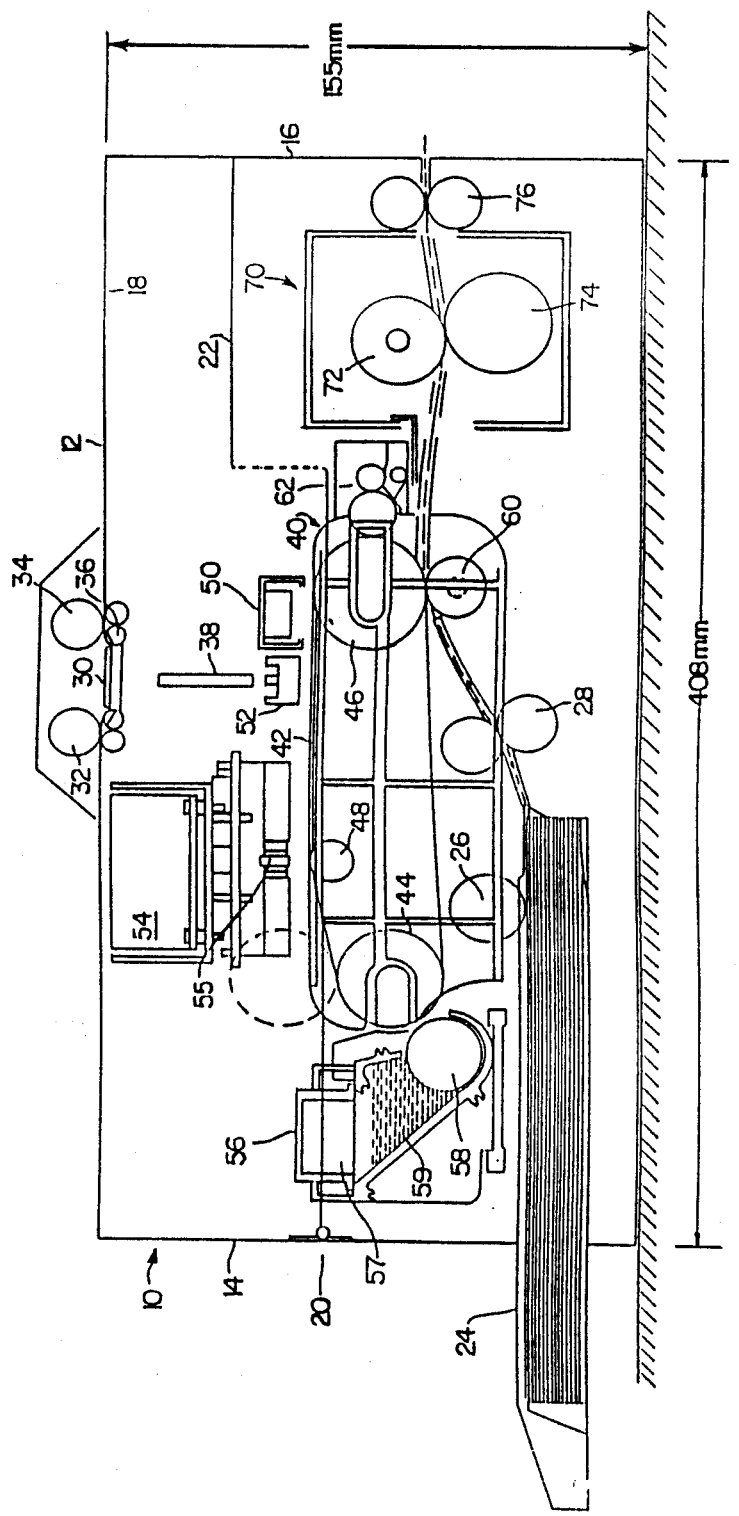
FIG. 1 is an illustration of the combined electrographic printer, copier, and telefax machine of the present invention.

Referring to FIG. 1, a schematic representation of the electrographic printer, copier, and telefax machine of the present invention is shown.

The novel electrographic printing apparatus 10 of the present invention comprises a housing 12 which includes side walls (not shown), a front wall 14, a back wall 16, and a top 18. A hinge 20 is located in front wall 14. The top 18 is desirably spring-loaded downward and held in place by a catch (not shown). The catch may be released at which time top 18 pivots upward about hinge 20 along the parting line 22. When this is done, the housing is opened along parting line 22 for easy access inside housing 10. Thus, paper jams may be removed and components within the apparatus can be replaced.

A paper feeding cassette 24 protrudes through front wall 14. Paper cassette 24 holds a supply of recording medium, for example, sheets of plain paper. The paper cassette may be of the kind described in the present assignee's previously mentioned application Ser. No. 718,945, filed April 2, 1985, or may be of another kind. The sheets of paper stacked inside cassette 24 are removed by means of paper feed roller 26. Registration rollers 28 carry the sheets of paper along paper path 29.

Top 18 of housing 12 includes an exposure window 30 and rollers 32 and 34 for aligning an original document to be scanned opposite exposure window 30. Just inside top 18, an aperture fluorescent 36 is provided for flashing the original document and producing a scanned image.

Inside housing 12 are photoconductive belt assembly 40 and the various other components which are needed to ensure that electrographic printing apparatus 10 carries out its varied tasks. Photoconductive belt assembly 40 is in the form of the disposable cassette described in the present assignee's previously mentioned application Ser. No. 718,947, filed April 2, 1985, now U.S. Pat. No. 4,657,369. It includes photoconductive belt 42, transport rollers 44 and 46, and idler roller 48. Transport rollers 44 and 46 rotate in a counter-clockwise direction as viewed in FIG. 1.

Arranged about photoconductive belt assembly 40 are various stations and units. Starting with charging station 50 and travelling counter-clockwise, they are CCD linear array 52, optical print head 54, developer unit 56, transfer roller 60, and cleaning unit 62. A fusing station 70, which includes heated roller 72 and rubber roller 74, and exit rollers 76 are also provided inside housing 12.

Between aperture fluorescent 36 and CCD linear array 52 is an image transmitter 38 of variable focal length. Image transmitter 38 may, for example, comprise a bundle of optical fibers having graded refractive indexes such as that sold by Nippon Sheet Glass Co., Ltd., of Japan under the name Selfoc. The Selfoc optical fiber bundle 38 can be adjusted for various focal lengths so that the image of the scanned document can be switchably projected onto either photoconductive belt 42 or onto CCD linear array 52, as desired. A second image transmitter 55, which also may be a Selfoc optical fiber bundle, is disposed between optical print head 54 and photoconductive belt 42. The light image from optical print head 54, which preferably comprises an LED array, is focused onto photoconductive belt 42 by means of Selfoc optical fiber bundle 55.

Developer unit 56 is similar to the developer unit which is disclosed and claimed in the present assignee's application Ser. No. 718,946, filed April 2, 1985, now U.S. Pat. No. 4,639,116. It includes a disposable toner cartridge 57 and a magnetic brush 58 which applies the developer material 59, which, in this case, is a single component developer. Whereas the developer unit described in the assignee's previously mentioned application acts as both a developer unit and a cleaning unit, the developer unit of the present invention functions as a developer only. This is because a separate and independent cleaning unit 62 is provided as a cleaning station for photoconductive belt 42. Cleaning unit 62 may be any of those well known to those skilled in the art, but preferably comprises the cleaning unit which is the subject of the assignee's application Ser. No. 033,457, filed April 1, 1987.

Rather than employing a traditional corona charger to transfer the developed image from the photoconductive belt to the sheet of recording medium, in accordance with the present invention, a biased transfer roller 60 is used to transfer the developed image to the sheet of paper. Transfer roller 6 is made from a metal or a photoconductive plastic material. Transfer roller 60 is biased at a voltage of about +24 V to about +100 V. While the use of biased transfer rollers has been known in the past, see for example U.S. Pat. No. 3,907,421 (Jordan et. al.), such prior art transfer rollers have been biased at a much higher voltage, for example, in the range of about 2,000–3,000 V in order to accommodate high speed copiers and printers. However, in accordance with the present invention, a much smaller voltage is needed because the printing time need not be as great as in prior art devices.

Transfer roller 60 performs an important function in holding the paper directly against photoconductive belt 42. This obviates the need for paper supporting elements, such as rollers, which are required when transfer is accomplished by means of a corona charger. Furthermore, because the paper is held directly against photoconductive belt 42 by means of transfer roller 60, the transfer zone itself is extremely short, and the overall paper path is both simple and short.

The electrographic printing apparatus of the present invention contains an on-board controller which controls and coordinates each of the operations of its various components. The controller receives a variety of signals from various sensors and command stations associated with the printer and sends out a variety of signals in response thereto. Thus, the controller receives signals from the various sensors to detect malfunctions in the printer and sends out signals to alert the operator to these malfunctions. The on-board controller also controls all of the operations of the printer and detects when the operator has selected any of the various functions which the printer is capable of carrying out. The controller ensures that each of the components necessary to carry out the operation fulfills its function as will be described hereinbelow.

(1) In the event the operator decides to copy and print an original document, the on-board controller activates the machine so that photoconductive belt 42 begins to rotate in a counterclockwise direction and charging unit 50 is switched on. Charging unit 50 uniformly charges the photosensitive surface of photoconductive belt 42 to a relatively high uniform negative potential on the order of about −600 V. In the meantime, the original document, which has been placed opposite exposure window 30 is illuminated by means of aperture fluorescent 36. Selfoc fiber bundle 38 is adjusted so that the scanned image of the original document is projected onto a uniformly charged photosensitive surface of photoconductive belt 42. This projected image selectively discharges portions of the photoconductive belt to form a latent electrostatic image of 150 V portions surrounded by −600 V background regions. The electrostatic latent image is brought opposite magnetic brush 58 of developer unit 56 and toner is applied to photoconductive belt 42. The toner particles carry a charge on the order of about 100 V and are attracted to the "relatively positive" −150 V discharged regions of the photoconductive belt while being repelled from the −600 V regions of the photoconductive belt.

Simultaneously, paper feed roller 26 is actuated to deliver a sheet of plain paper along paper path 29. The sheet is brought between photoconductive belt 42 and transfer roller 60. Transfer roller 60, biased at a voltage of +24 V to about +100 V by means well known to those skilled in the art, creates an electric field about the sheet of paper whereby the developed powder image is attracted from photoconductive belt 42 to the top side of the sheet of paper. The sheet of paper then enters fusing station 70 where heated roller 72 fuses the powder image into the paper. From there the sheet of paper is brought by means of exit rollers 72 through an ejection aperture in back wall 16. At the same time, cleaning unit 62 is activated to remove residual toner particles from photoconductive belt 42 and to prepare photoconductive belt 42 for use once again.

(2) In the event the operator has elected to transmit the image of the original document via the telephone lines to a remote location, Selfoc fiber bundle 38 projects the scanned image onto CCD linear array 52. CCD linear array 52 digitizes the image line by line and the controller, using appropriate software, compresses the digitized image and forms it into a bit stream. The controller then activates a modem (not shown) which transmits the compressed bit stream via the telephone lines to a remote location.

(3) In the event the operator elects to print or download information from a computer connected directly to the electrographic printing apparatus, the operation of the machine is similar to that described for copying an original document. However, in this case, optical print head 54 projects a light image in response to signals received from the controller. This light image is focused by means of fiber optic bundle 55 onto photoconductive belt 30 to form an electrostatic latent image of the information to be printed onto photoconductive belt 42. Thereafter, development and transfer of the electrostatic latent image to a sheet of recording medium occurs in the same manner as previously described.

(4) In the event it is desired to print information from a remote source, such as a remote computer or a remote telefax machine, a bit stream is received by the controller's modem. The on-board controller activates optical print head 54 in conformity with the information received from the remote source. Thereby, the information received from the remote source is formed as an electrostatic latent image on photoconductive belt 42 and is developed and transferred to a sheet of recording medium as previously described.

Thus, a combined electrographic printing apparatus is described herein which is capable of acting as a copier, a printer, and a telefax machine. By using appropriate software, it is also possible to adapt the machine to store the scanned image as digitized information in a computer for later retrieval.

It is important to the configuration of the electrographic printing machine of the present invention that the photoconductive belt assembly 40 be mounted horizontally within housing 12 of the device. This is important because it enables the apparatus of the present invention to be a compact, low-profile machine. The machine is approximately of briefcase size. The horizontal configuration also provides more room opposite photoconductive belt 42 so that an optical print head can be disposed along side of the units needed for copying an original document or transmitting its image to a remote location.

While the invention has been described by reference to specific embodiments, this was for purposes of illustration only and should not be construed to limit the spirit or the scope of the invention.

I claim:

1. An electrographic printing apparatus, comprising:
    a housing,
    a photoconductive member,
    means for uniformly charging said photoconductive member, first and second means for selectively discharging said photoconductive member to produce a latent electrostatic image on said photoconductive member,
    means for developing said latent electrostatic image, and
    means for transferring the developed electrostatic image to copy material in a transfer zone,
    a paper path operative to transport copy material from a source of copy material, through said transfer zone, and to an exit of said housing,
    wherein said photoconductive member comprises a photoconductive belt horizontally disposed in said housing, said first and second selective discharge means are disposed above said photoconductive belt, and said transfer zone is located on a lower side of said photoconductive belt.

2. The electrographic printing apparatus of claim 1 wherein said paper path is operative to transport copy material through said transfer zone from below.

3. The electrographic printing apparatus of claim 2 wherein said source of copy material and said exit are both located below said photoconductive member.

4. The electrographic printing apparatus of claim 1 wherein said transfer means comprises a biased transfer roller.

5. The electrographic printing apparatus of claim 4 wherein said transfer roller is biased at a voltage in the range of about +24 V to about +100 V.

6. The electrographic printing apparatus of claim 1 wherein said housing includes a top portion attached to said housing by a hinge, said top portion being pivotable upward about said hinge so as to provide access to the interior of said housing.

7. The electrographic printing apparatus of claim 1, further comprising means for receiving information from a local or a remote source, said first selective discharge means being operatively connected to said receiving means for producing a latent electrostatic image on said photoconductive belt corresponding to the information received form said local or said remote source.

8. The electrographic printing apparatus of claim 1, wherein said second selective discharge means comprises scanning means for scanning an original document and for producing a latent electrostatic image on said photoconductive belt corresponding to said original document.

9. The electrographic printing apparatus of claim 8, further comprising transmitting means operatively associated with said scanning means for transmitting information corresponding to said original document to a remote location.

10. The electrographic printing apparatus of claim 1 wherein said first and second selective discharge means comprise first and second illuminating means.

11. The electrographic printing apparatus of claim 1 wherein said paper path is located entirely below said photoconductive belt.

12. The electrographic printing apparatus of claim 1 wherein said first selective discharge means comprises an optical print head.

13. The electrographic printing apparatus of claim 1 wherein said selective discharge means comprises an LED array.

14. The electrographic printing apparatus of claim 1 wherein said selective discharge means comprises a laser light source.

15. An electrographic printing apparatus, comprising:
    a housing,
    a photoconductive member,
    means for uniformly charging said photoconductive member,
    means first and second for selectively discharging said photoconductive member, and control means for controlling said first and second selective discharge means to produce a latent electrostatic image on said photoconductive member which corresponds to information on an original document to be copied, information received from local source, or information received from a remote source.

16. The electrographic printing apparatus of claim 15 further comprising means for transmitting a data stream corresponding to an original document to a remote location.

17. The electrographic printing apparatus of claim 15 further comprising image sensing means for converting an image into a data stream,
   means for scanning an original document, and
   means for switchably projecting an image of said original document onto said photoconductive member or onto said image sensing means.

18. The electrographic printing apparatus of claim 15 further comprising means for developing said latent electrostatic image, and
   means for transferring the developed electrostatic image to copy material, said transfer means comprising a biased transfer roll.

19. The electrographic printing apparatus of claim 15 wherein said photoconductive member comprises a photoconductive belt horizontally mounted within said housing.

20. The electrographic printing apparatus of claim 15 wherein said first selective discharge means comprises an optical print head.

21. The electrographic printing apparatus of claim 15 wherein said first selective discharge means comprises a laser light source.

22. The electrographic printing apparatus of claim 15 wherein said first selective discharge means comprise an LED light array.

23. An electrographic printing apparatus, comprising:
   a housing,
   a photoconductive member,
   means for uniformly charging said photoconductive member,
   means first and second for selectively discharging said photoconductive member, and
   control means for controlling said first and second selective discharge means to reproduce a latent electrostatic image on said photoconductive member which corresponds to information on an original document to be copied, information received from a local source, or information received from a remote source,
   wherein said information received from a local source comprises a data stream.

24. An electrographic printing apparatus, comprising:
   a housing,
   a photoconductive member,
   means for uniformly charging said photoconductive member,
   first and second means for selectively discharging said photoconductive member, and
   control means first and second for controlling said selective discharge means to produce a latent electrostatic image on said photoconductive member which corresponds to information on an original document to be copied, information received from a local source, or information received from a remote source,
   wherein said information received from a remote source comprises a data stream.

* * * * *

UNITED STATES PATENT AND TRADEMARK OFFICE
CERTIFICATE OF CORRECTION

PATENT NO. : 4,959,731  Page 1 of 3

DATED : September 25, 1990

INVENTOR(S) : Kensuke Fukae

It is certified that error appears in the above-identified patent and that said Letters Patent is hereby corrected as shown below:

Claims 13, 14, 15, 23 and 24 should read as set out below.

Signed and Sealed this

Fourth Day of August, 1992

Attest:

DOUGLAS B. COMER

Attesting Officer          Acting Commissioner of Patents and Trademarks

13. The electrographic printing apparatus of claim 1 wherein said *first* selective discharge means comprises an LED array.

14. The electrographic printing apparatus of claim 1 wherein said *first* selective discharge means comprises a laser light source.

15. An electrographic printing apparatus, comprising:

a housing, a photoconductive member, means for uniformly charging said photoconductive member,

[means] first and second *means* for selectively discharging said photoconductive member, and control means for controlling said first and second selective discharge means to produce a latent electrostatic image on said photoconductive member which corresponds to information on an original document to be copied, information received from local source, or information received from a remote source.

23. An electrographic printing apparatus, comprising:

a housing, a photoconductive member, means for uniformly charging said photoconductive member,

[means] first and second *means* for selectively discharging said photoconductive member, and control means for controlling said first and second selective discharge means to reproduce a latent electrostatic image on said photoconductive member which corresponds to information on an original document to be copied, information received from a local source, or information received from a remote source, wherein said information received from a local source comprises a data stream.

24. An electrographic printing apparatus, comprising:

a housing, a photoconductive member, means for uniformly charging said photoconductive member, first and second means for selectively discharging said photoconductive member, and control means [first and second] for controlling said first and second selective discharge means to produce a latent electrostatic image on said photoconductive member which corresponds to information on an original document to be copied, information received from a local source, or information received from a remote source, wherein said information received from a remote source comprises a data stream.

\* \* \* \* \*